Nov. 11, 1969    J. J. SLOYAN    3,477,670
HINGED SUPPORT FOR MOTORS AND OTHER MACHINERY
Filed Jan. 10, 1968    2 Sheets-Sheet 1

INVENTOR.
Jerome J. Sloyan
BY
Howard P. King
ATTORNEY

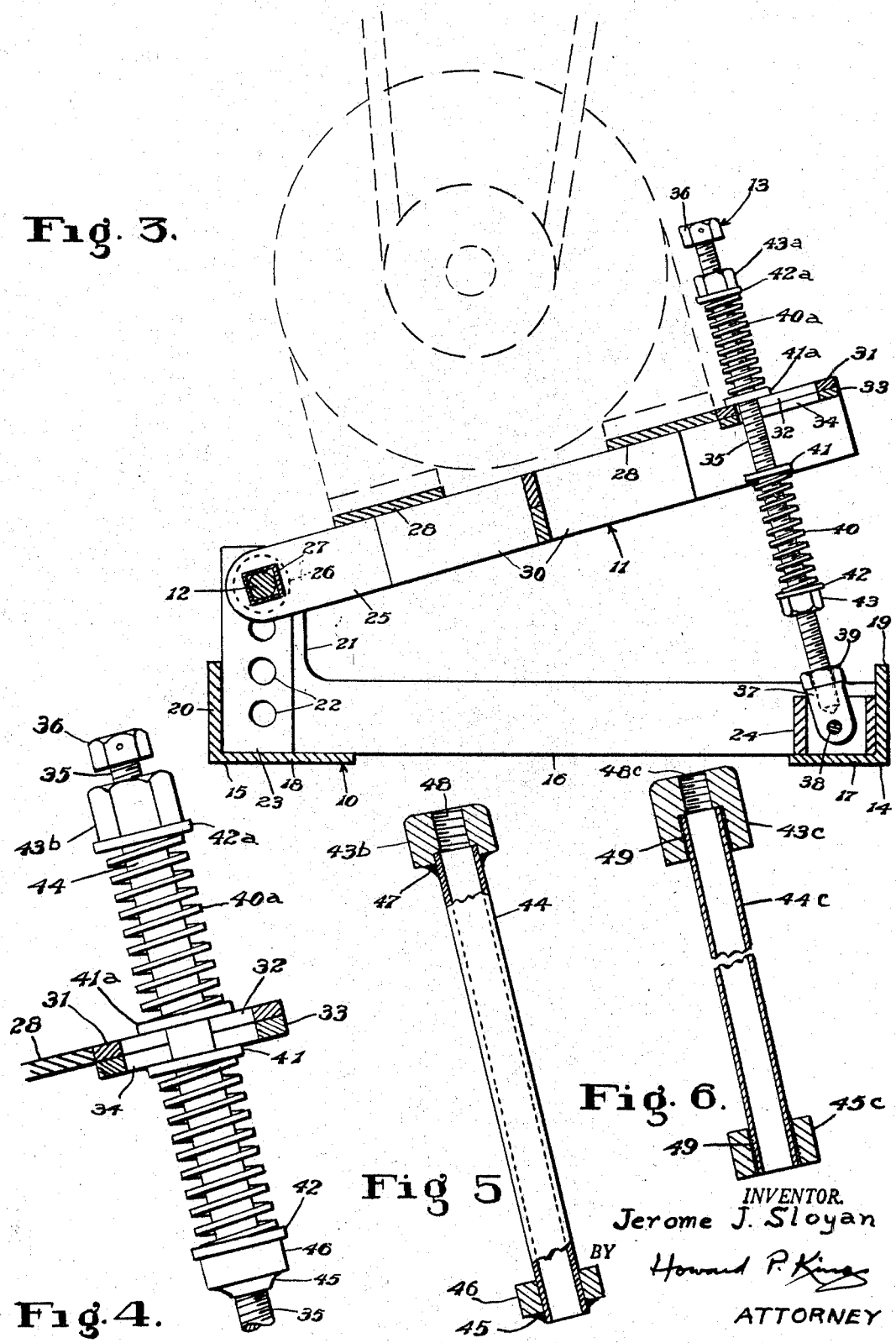

United States Patent Office 3,477,670
Patented Nov. 11, 1969

3,477,670
HINGED SUPPORT FOR MOTORS AND OTHER MACHINERY
Jerome J. Sloyan, Trenton, N.J.
(% Automatic Motor Base Co., Windsor, N.J. 08561)
Filed Jan. 10, 1968, Ser. No. 696,747
Int. Cl. F16f 15/00; F16m 1/00, 7/00
U.S. Cl. 248—23                                           5 Claims

ABSTRACT OF THE DISCLOSURE

A pivoted or tilting support for a motor or other machinery, said support having individual means for adjusting to a standard belt length and for adjusting to load conditions and belt tension.

---

Somewhat more specifically than in the brief statement above, the invention provides essentially a device comprising one member to be permanently attached to floor, wall, bench, ceiling, or elsewhere, and a second or movable member hinged to the first and having a motor or other piece of machinery attached thereto. Provision is made for changing the height with respect to the fixed member of the hinge pin about which the movable member is pivoted, thus permitting the rotor or other piece of machinery to be located so that a standard length of belt can be used. Secondly, provision is made for applying a proper amount of tension to the belt, and thirdly, to provide for that tension in proper amount regardless of the mounting position of the fixed member and regardless of whether the belt extends in a direction tending to swing the members together or swing them apart.

In the drawings;

FIGURE 3 is a view corresponding to FIG. 2, but showing the device arranged for and subjected to a load condition tending to swing the members apart;

FIGURE 4 is a fragmentary showing of the device with a modified tensioning mechanism;

FIGURE 5 is a view, partially in elevation and partially in section, showing a longitudinally adjustable sleeve as used in the modified construction of FIG. 4; and FIGURE 6 is a view similar to FIG. 5, showing a construction of adjustable sleeve in which the spring abutments are unified with the sleeve by an adhesive type of securing means.

Figure 1:
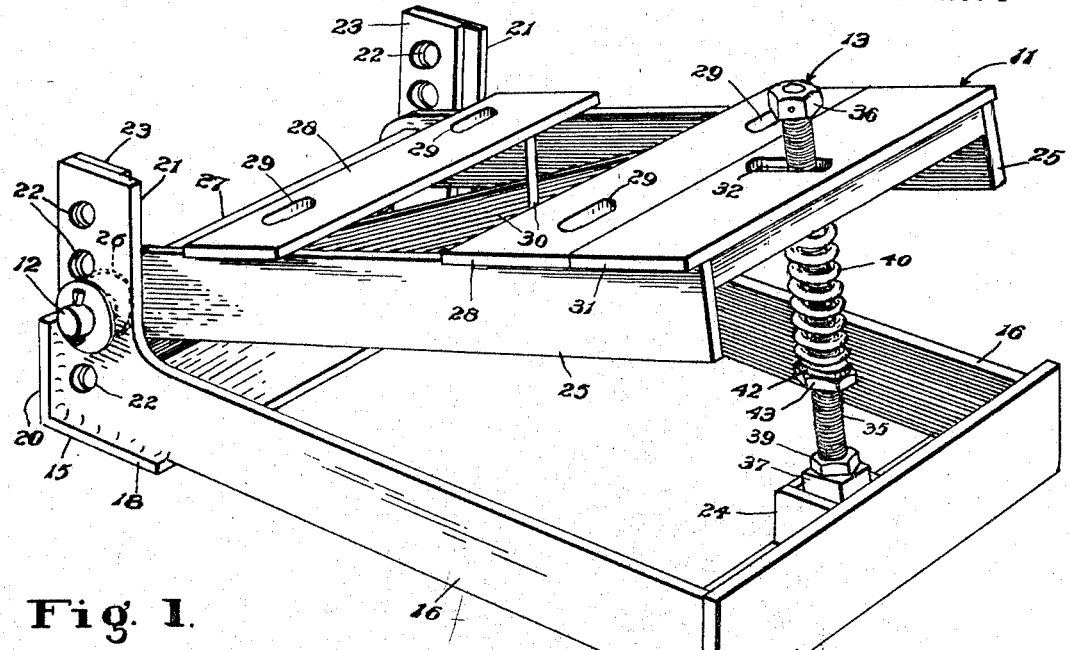
FIGURE 1 is a perspective view of the fundamental construction of the device in simplest form arranged for use wherein the belt tension will tend to close the hinged member toward the fixed member.
Figure 2:
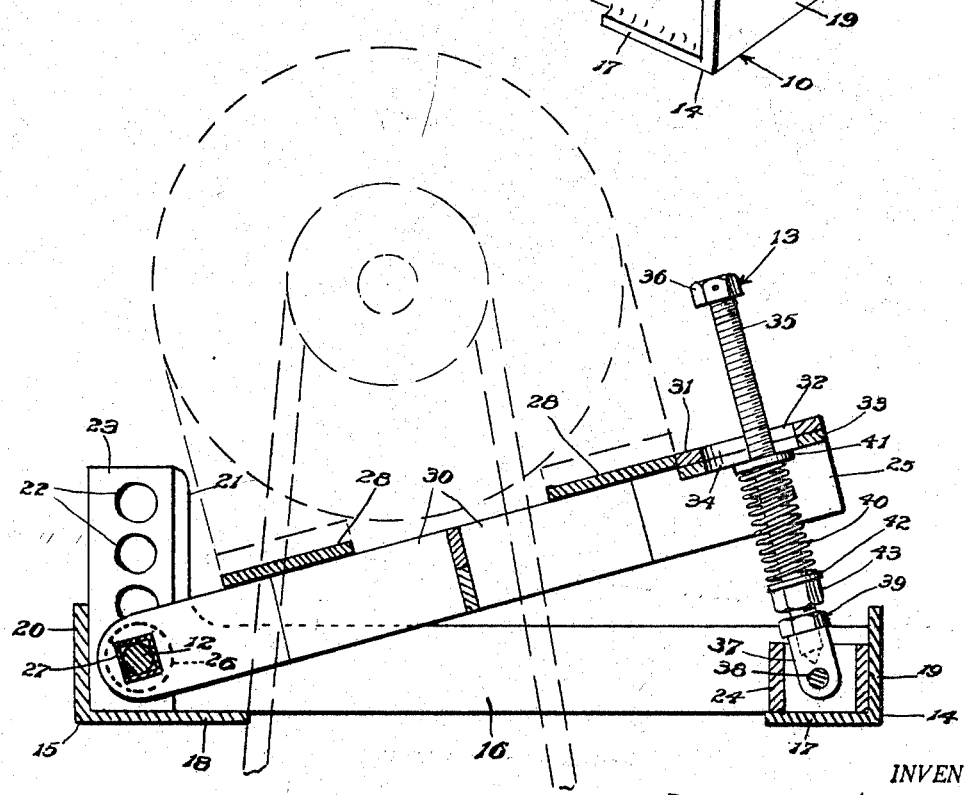
FIGURE 2 is a central vertical sectional view of the device of FIG. 1, showing the same under load conditions.

Directing attention initially to the construction and use of the invention as illustrated in FIGURES 1 and 2, the reference numeral 10 designates in general what will be termed a fixed member of open frame character, to which is hinged a movable member 11 by a transversely located hinge pin 12. Proximate to the corresponding ends of the two members remote from the hinging thereof, is a tensioning mechanism 13 by which the degree of swing of the movable member 11 under effects of weight and belt tension may be controlled.

Considering now more in retail the physical characteristics of the generally mentioned constituents involved in the invention, it may first be observed that fixed member 10, in fulfillment of its characterization as a frame, utilizes a pair of parallel basal cross-beams 14, 15, each having the form of an integrated angle iron, located at what may be termed the front and back ends of the frame respectively. Proximate to the respective ends of the said cross-beams, are side stringers 16 each welded or otherwise secured at its opposite ends to the front and back cross-beams, and forming therewith an open rectangular frame. The cross-beams, by virtue of their angle-iron construction, may be said to provide bottom flanges 17, 18 which are in a common plane and which extend under the bottom edges of the said side stringers. The other constituent parts of the cross-beams, by virtue of their angle-iron characteristic may be designated for convenience as upright flanges 19, 20 and are located against the ends of the side stringers 16.

Said side stringers, at their rear ends, have up-standing legs 21 giving an L-shaped appearance to the stringers viewed in side elevation. These up-standing legs are provided with corresponding holes 22 therein for selective reception of the above-mentioned hinge pin 12. For purpose of affording greater rigidity to the upright legs 21 and additional bearing surface for hinge pin 12 in the holes 22, vertical cleats 23 may be welded to the inwardly directed faces of said legs. All parts of the fixed member 10 above described, except the hinge pin, are welded together to form a rigid entity. Likewise welded midway of the length of the front cross-beam, within the angular configuration thereof, is a rectangular well 24 for receiving and retaining the lower end of the above-mentioned tensioning mechanism 13, to which further reference will be made hereinafter.

The movable member 11 likewise has the characteristic of an open frame the two opposite sides whereof are constituted by metallic bars 25 of rectangular cross-section arranged with their greater faces in parallel vertical planes. The rear ends of said bars are spaced from each other so as to be located next to the vertical cleats 23 of the fixed member with only sufficient spacing therefrom to admit a washer 26. The aforesaid hinge pin 12 passes through said bars proximate to their rear ends, and preferably a spacer tube 27 of square or other suitable cross-section extends from one bar to the other, preferably being welded thereto, said hinge pin 12 passing through the tube and making line contact therewith so as to minimize frictional resistance to free swinging of the movable member on the hinge pin.

Appropriately spaced lengthwise of the side bars 25, overlapping the upper edges thereof, are transverse bed-plates 28, welded in fixed positions thereon. Slots 29 are provided in these bed-plates for passage therethrough of bolts (not shown) by which a motor or other piece of machinery may be attached in its operative position. Crisscrossing diagonally between the side bars 25 and terminating under said bed-plates 28, are braces 30 which are welded at their ends to the side bars and, if desired, also to the bed plates.

At the front end of the movable frame, extending across the top edges of the side bars and welded thereto, is a pressure-receiving plate or spring-seat 31 the top face whereof is coplanar with the top face of the proximate bed-plate 28. Midway of the length of this pressure plate or spring seat 31 there is a slot 32 extending in a direction forwardly and rearwardly of the movable member. In order to compensate for the loss of strength resulting from provision of such a slot, the pressure plate may be reenforced, which is conveniently and effectively accomplished by inclusion of a secondary plate or sub-seat 33 in facial engagement at the under side of and welded to the pressure plate, preferably extending from one side bar 25 to the other and provided with a slot 34 registering with the slot 32 in the overlying pressure plate 31. Inasmuch as all of the above-mentioned parts of the movable member are welded into a unitary structure and include diagonal braces, said member will be fully rigid and adapted for use in any position of mounting of the device in use, horizontally, vertically or otherwise.

The aforementioned tensioning mechanism 13, in its basic concept, and generic to all forms herein disclosed, utilizes a stud 35 screw-threaded throughout its length. The stud projects upwardly from the fixed member 10 through the slots 34 and 32 of the sub-seat 33 and pressure plate 31, and at its upper end has a nut-like head 36 as a fixed adjunct thereto. The lower end of the stud is screwed into a clevis 37 that projects downwardly into afore-mentioned rectangular well 24. A pivot pin 38 extends transversely of the clevis both through it and through the side walls of the well, thereby enabling the clevis to teeter in a direction forwardly and rearwardly of the fixed frame to respond to the angular change of position of the movable member 11 with respect to the fixed member 10. A lock nut 39 on the stud at the top of the clevis retains the stud and clevis in fixed assembly.

In the specific showing and use of the invention appearing in FIGURES 1 and 2, a spring 40 is interposed between the fixed member 10 and the movable member 11, tending to spread those members apart. As illustrated, said spring may conveniently be of the longitudinal coil type coaxial to and upon said stud, bearing at its upper end against a washer 41 loose on the stud and riding against the under face of subseat 33 marginally of slot 34. Said spring is held at its lower end from downward displacement by a washer 42 intervening between it and an adjusting nut 43 on the stud. Compressive pressure exerted by the spring may be changed to meet existing requirements by adjusting said nut on the threaded stud. Since the motor belt is kept taut by compression of spring 40, it is desirable to observe the precaution of utilizing a head 36 on the stud of sufficient size to not be able to pass through slot 32 of pressure plate 31 should the belt break or otherwise become ineffective contra to the spring pressure.

While the showing of the invention in FIGURES 1 and 2 contemplates a use wherein belt tightening is effected by the spring tending to swing the movable member 11 away from the fixed member 10, occasion may exist for a use requiring spring tension in the opposite direction, and such a situation is indicated in FIGURE 3. Basically, the invention includes both modes of use, the spring to produce the belt tension in the second instance being applied to the stud above the movable member rather than below it. Specific to this feature, a spring 40a of longitudinal coil type is shown on the upper portion of stud 35 in FIG. 3, bearing, this time, against a washer 41a loose on the stud and riding against the upper face of pressure plate 31. Here, also, said spring is held at its upper end against displacement by a washer 42a intervening between it and an adjusting nut 43a on the stud. It may well be desirable to retain the spring 40 below the movable member, which, though normally then not needed, yet will be present to take up the shock of the drop of the movable member should tension in the belt become ineffective.

It will be observed that inclusion of the two springs 40 and 40a in the assembly of FIGURE 3, enables use of the support of this invention in situations wherein the belt tension is applied tending to either swing the movable member toward the fixed member or tending to swing them apart. The appropriate adjusting nut 43 or 43a would of course have to be brought to proper position, depending upon which spring is used to counteract the belt pressure. Gravity and operating pull also enter into that consideration.

To avoid improper adverse adjustment of one spring when making adjustment of the other, and for simplicity in making the proper adjustment simultaneously for both springs, consideration may now be directed to the modifications of FIGURES 4, 5 and 6. First considering FIGURES 4 and 5, a sleeve 44 is located slidably upon the stud 35 extending within the entire lengths of springs 40 and 40a as well as through the pressure plate 31 and sub-seat 33. Secured at the bottom of the sleeve 44, as with welding 45, is a pressure-receiving collar 46. Washer 42 may be interposed between the collar and the bottom end of spring 40, if desired. Consistent with the previously described assembly, a washer 41 is located at the upper end of the lower spring 40 and rides against the under face of the sub-seat 24. Pressure of this spring is varied by sliding the sleeve to appropriate position on the stud 35.

Further considering FIGURES 4 and 5, the upper spring 40a, as in the previously described assembly, has a washer 41a interposed between its bottom end and the upper face of the pressure plate 31. The upper end of upper spring 40a bears against a washer 42a interposed between the spring and a nut-shaped collar 43b secured, as by welding 47, at the upper end of sleeve 44. Said nut-shaped collar has internal screw-threads 48 inter-engaging with the screw-threads of the stud. Rotation of said nut-shaped collar 43b consequently will be effective to slide the sleeve longitudinally of the stud, and dependent upon which way it is rotated, the sleeve will be effective to produce compression in one or the other of said springs 40, 40b. Simultaneously the spring not being subjected to the compression, will have its tension reduced and, if sliding of the sleeve is continued, will be ultimately entirely relieved from exerting pressure.

The showing in FIG. 6 corresponds to the construction of FIGS. 4 and 5 in provision of a sleeve 44c having a collar 45c fixed on the bottom end thereof, and having a nut-shaped collar 43c fixed to the upper end of the sleeve, this latter collar likewise being internally screw-threaded at 48c. The difference is, that in FIG. 6, said collars are permanently attached by an adhesive 49, such as epoxy, included between the collars and sleeve, instead of utilizing welding for such attachment. It will of course be understood that the arrangement of FIGURE 6 will be utilized with a stud threaded therethrough similar to the showing of FIG. 4, and that the studs in any of these showings are to be secured in a clevis in accordance with the disclosure of FIGURES 1 to 3.

In instances where the loop of the motor belt is in a vertical plane with the motor hanging in the loop as evidenced in FIGURE 3, and if the effective weight of the motor is insufficient to provide enough tension to the belt, the spring above the movable member can be adjusted to make up for the deficiency. On the other hand, if the effective weight of the motor provides more tension than required on the belt (resulting in undue stresses being applied to the belt and bearings) the springs would be adjusted to apply tension in the lower one and release tension from the upper one. For clarity, it may be here interpolated, that proper amount of tension is defined as the minimum necessary to transmit the required power. A less tension will result in slippage, and a greater tension will result in undue stresses being applied to the belt and bearings to the detriment of both. It may be added, that since the construction of FIGURES 4, 5 and 6 will simultaneously release amount of pressure of one spring while increasing the pressure exerted by the other there is no possibility of tightening both springs and losing effect of spring pressure in the desired direction only.

I claim:

1. A support of the character described, comprising a relatively fixed member and a movable member substantially coextensive one with the other, said members being hinged together proximate to a common end of each, tensioning mechanism interposed between said members and extending through the movable member, said tensioning mechanism being pivotally mounted on the fixed member at an opposite end portion of said fixed member from hinging of the movable member to the fixed memmember, a machine securely mounted on said movable member, said machine having a rotatable element with a pulley wheel thereon disposed on an axis parallel to the said hinging of said members and at a location between said hinging and said tensioning mechanism, said pulley wheel having a belt thereon the reaches whereof at the sides of the pulley wheel having linear direction transverse to said movable member intersecting the plane thereof in the region between said hinging and tensioning mechanism, said fixed frame at its end portion most remote from said tensioning mechanism terminating at its sides with upstanding legs having vertical series of hinge-pin-receiving holes with corresponding holes in the opposite legs in axial alignment as pairs for selectively mounting the hinge pin, said tensioning mechanism providing a clevis pivoted to the fixed member and also providing a threaded stud fixed in and projecting upwardly from the clevis to a greater height above said fixed member than height of said legs, two springs longitudinally of said stud with one said spring above and the other below said movable member, and means comprising at least in part a sleeve extending through both of said springs and through said movable member and also comprising at least in part an element on said sleeve in rotable threaded engagement with said stud for regulating advancement and retraction of the springs toward and from the movable member where said mechanism passes through said movable member.

2. A support in accordance with claim 1, wherein said hinging of said members comprises a hinge pin extending from side to side of the fixed member and wherein said movable member provides a cross-sectionally square tube encompassing the hinge pin and making a plurality of separated line contacts therewith longitudinally thereof.

3. A support in accordance with claim 1, wherein said sleeve is rotatable on said stud.

4. A support in accordance with claim 3, wherein said elements comprise collars at opposite ends at least one of said collars making threaded engagement with said stud.

5. A support in accordance with claim 4, wherein both of said collars are fixed on said sleeve.

References Cited

UNITED STATES PATENTS

| 1,338,555 | 4/1920 | Cook et al | 248—23 |
| 2,271,830 | 2/1942 | Pye | 248—23 |
| 2,791,126 | 5/1957 | Christopher | 74—242.13 |
| 2,124,845 | 7/1938 | Cobb. | |
| 2,125,004 | 7/1938 | Hamerstadt | 248—23 |

ROY D. FRAZIER, Primary Examiner

J. FRANKLIN FOSS, Assistant Examiner

U.S. Cl. X.R.

74—242.13; 108—10; 248—13